United States Patent
Innami et al.

(10) Patent No.: US 11,433,947 B2
(45) Date of Patent: Sep. 6, 2022

(54) SUBFRAME FOR VEHICLE

(71) Applicant: F-TECH INC., Kuki (JP)

(72) Inventors: Masamitsu Innami, Tochigi (JP);
Hiroyuki Uchida, Tochigi (JP)

(73) Assignee: F-TECH INC., Kuki (JP)

( * ) Notice: Subject to any disclaimer, the term of this patent is extended or adjusted under 35 U.S.C. 154(b) by 115 days.

(21) Appl. No.: 17/010,214

(22) Filed: Sep. 2, 2020

(65) Prior Publication Data

US 2021/0070369 A1    Mar. 11, 2021

(30) Foreign Application Priority Data

Sep. 6, 2019  (JP) .............................. JP2019-163137

(51) Int. Cl.
| | | |
|---|---|---|
| *B62D 21/15* | (2006.01) | |
| *B62D 21/11* | (2006.01) | |
| *B62D 21/09* | (2006.01) | |
| *B62D 21/03* | (2006.01) | |

(52) U.S. Cl.
CPC .......... *B62D 21/155* (2013.01); *B62D 21/03* (2013.01); *B62D 21/09* (2013.01); *B62D 21/11* (2013.01)

(58) Field of Classification Search
CPC ....... B62D 21/155; B62D 21/03; B62D 21/09
See application file for complete search history.

(56) References Cited

U.S. PATENT DOCUMENTS

| | | | |
|---|---|---|---|
| 2012/0187724 A1* | 7/2012 | Tomozawa | B62D 21/11 296/193.09 |
| 2014/0110925 A1* | 4/2014 | Goellner | B62D 21/155 280/781 |
| 2018/0273098 A1* | 9/2018 | Komiya | B62D 21/155 |

FOREIGN PATENT DOCUMENTS

| | | | | |
|---|---|---|---|---|
| JP | 2004098799 A | * | 4/2004 | ............. B60G 99/00 |
| JP | 2016-60311 A | | 4/2016 | |
| JP | 2018176866 A | * | 11/2018 | |
| JP | 2019107925 A | * | 7/2019 | |

* cited by examiner

*Primary Examiner* — Lori L Lyjak
(74) *Attorney, Agent, or Firm* — WHDA, LLP

(57) ABSTRACT

In a vehicle subframe 1, a pair of side members 110 and 130 includes upper side members 111 and 131 and lower side members 117 and 137, respectively, the lower side members 117 and 137 extending opposed on a downward side to the upper side members 111 and 131 while being elongated to a rearward side, and a pair of mounting members 60 and 80 is joined respectively to the lower side members 117 and 137 of the pair of side members 110 and 130.

4 Claims, 6 Drawing Sheets

SUBFRAME FOR VEHICLE

BACKGROUND OF THE INVENTION

The present invention relates to a vehicle subframe, and particularly relates to a vehicle subframe that supports suspension arms and the like and is attached to a vehicle such as an automobile.

In recent years, various parts applied with external forces are fitted to a subframe to be attached to a vehicle such as an automobile. The various parts applied with external forces include suspension-related parts such as a suspension arm and a stabilizer, steering-related parts such as a steering gearbox, and engine and transmission-system mounting-related parts.

Therefore, it is desired that the subframe as described above is attached to a vehicle body with a further increased strength and rigidity of the subframe, while improving improved productivity and other factors of the subframe.

Further, at the time of, typically, front collision of a vehicle having the subframe attached thereto, the subframe is required to become deformed in a desired deformation mode for absorbing a part of the kinetic energy received by the vehicle at the time of the collision, that is, to exhibit required collision performance.

Under such circumstances, Japanese Patent Application Laid-open No. 2016-060311 discloses a subframe structure 1 including side members 11 extending in a vehicle forward-rearward direction with a front end portion and a rear end portion of the side members 11 connecting with a vehicle body frame, a rear cross member 12 overlapping on the side members 11 and extending in a vehicle width direction to connect the side members 11, extending portions 13, each of which extends forward to the vehicle from an overlapping portion T of the side member 11 and the rear cross member 12, the extending portions 13 being formed integrally with the rear cross member 12, and mounting stays 15, each of which is mounted to the vehicle body frame provided at the rear end portion of the overlapping portion T.

SUMMARY OF THE INVENTION

However, according to the studies by the present inventors, it is supposed in the configuration disclosed in Japanese Patent Application Laid-open No. 2016-060311 that aluminum alloy or other press-formed products are used as lower side members 11a and upper side members 11b, and aluminum alloy or other cast products are used as an integrally-formed article made up of the rear cross member 12 and the extending portions 13, and as the mounting stays 15. Thus, both the press-formed products and the cast products are used in combination, which makes the configuration more complex. Accordingly, many types of welding processes are needed for these products. It is believed that the design work for collision performance tends to be complicated, and thus there is room for improvement.

Japanese Patent Application Laid-open No. 2016-060311 does not disclose or suggest any specific configuration to have a strength and rigidity as high as or higher than those in the disclosed configuration and to exhibit required collision performance, when the main constituent members of the subframe are limited to only press-formed products.

The present invention has been made in view of the above studies, and an object of the present invention is to provide a vehicle subframe that can have an increased strength and rigidity and can exhibit required collision performance, while uniformly applying press-formed products as main constituent members of the subframe.

In order to achieve the above object, a first aspect of the present invention provides a vehicle subframe to be attached to a vehicle body through a pair of front vehicle-body mounting portions provided opposite to each other in a width direction of the vehicle body on a forward side in a forward-rearward direction of the vehicle body, through a pair of rear vehicle-body mounting portions provided opposite to each other in the width direction on a rearward side in the forward-rearward direction, and through a pair of intermediate vehicle-body mounting portions provided opposite to each other in the width direction between the front vehicle-body mounting portions and the rear vehicle-body mounting portions in the forward-rearward direction, the vehicle subframe comprising: a pair of side members disposed opposite to each other in the width direction while extending in the forward-rearward direction, the pair of side members being provided with the pair of front vehicle-body mounting portions and the pair of rear vehicle-body mounting portions correspondingly, each of the side members being formed from a plate member; a cross member extending in the width direction while connecting the pair of side members, the cross member being formed from a plate member; and a pair of mounting members disposed opposite to each other in the width direction, each of which extends toward an outer side in the width direction while protruding toward an upward side in an upward-downward direction of the vehicle body, the pair of mounting members being provided with the pair of intermediate vehicle-body mounting portions correspondingly, wherein the pair of side members includes upper side members and lower side members, respectively, the lower side members extending opposed on a downward side in the upward-downward direction to the upper side members while being elongated to the rearward side, and the pair of mounting members is joined respectively to the lower side members of the pair of side members correspondingly.

According to a second aspect of the present invention, in addition to the first aspect, the pair of mounting members is provided respectively with a part of a pair of arm support portions located opposite to each other in the width direction to support a pair of suspension arms correspondingly.

According to a third aspect of the present invention, in addition to the first or second aspect, the cross member includes an upper cross member and a lower cross member disposed on the downward side relative to the upper cross member and joined to the upper cross member, the upper side members of the pair of side members are joined respectively to opposite outer front end portions of the upper cross member in the width direction, and extend from the opposite outer front end portions toward the forward side, and the lower side members of the pair of side members are joined respectively to the upper side members, the upper cross member, and the lower cross member, the upper side members of the pair of side members are provided with the pair of front vehicle-body mounting portions correspondingly, while the lower side members of the pair of side members are provided with the pair of front vehicle-body mounting portions and the pair of rear vehicle-body mounting portions correspondingly, the pair of side members respectively includes weakened portions on the forward side relative to the pair of intermediate vehicle-body mounting portions, the weakened portions being deformable against an impact force applied toward the rearward side, and the lower side members of the pair of side members respectively include reinforcement portions continuously connecting the pair of intermediate vehicle-body mounting portions and the pair of rear vehicle-body mounting portions correspondingly in the forward-rearward direction, the reinforcement portions having a shape protruding in the upward direction or the downward direction in cross-section taken along a plane parallel to a plane defined by the upward-downward direction and the width direction.

According to a fourth aspect of the present invention, in addition to the third aspect, opposite end portions of the lower cross member in the width direction extend in the forward-rearward direction respectively along the reinforcement portions of the lower side members of the pair of side members, and constitute a pair of bulkhead portions, each of which extends toward the upward side, and upper end portions of the pair of bulkhead portions in the upward-downward direction are respectively joined to the upper cross member.

According to a fifth aspect of the present invention, in addition to the fourth aspect, in cross-section taken along a plane parallel to a plane defined by the upward-downward direction and the width direction, the vehicle subframe has a closed cross-section defined by the upper cross member, the lower cross member, and the pair of bulkhead portions in cooperation with each other, a closed cross-section defined by the upper cross member, one of the lower side members of the pair of side members, and one of the pair of bulkhead portions in cooperation with each other, and a closed cross-section defined by the upper cross member, the other one of the lower side members of the pair of side members, and the other one of the pair of bulkhead portions in cooperation with each other.

In the configuration according to the first aspect of the present invention, a pair of side members includes upper side members and lower side members, respectively, the lower side members extending opposed on a downward side to the upper side members while being elongated to the rearward side, and a pair of mounting members is joined respectively to the lower side members of the pair of side members. This configuration can increase the strength and rigidity of the vehicle subframe, and can also ensure that an impact force applied at the time of, typically, front collision of the vehicle is transmitted to the vehicle body in a distributed manner through a cross member and a pair of vehicle-body mounting members. This can reduce the occurrence of undesirable deformation and crush of the vehicle subframe, and can consequently exhibit required collision performance.

In the configuration according to the second aspect of the present invention, the pair of mounting members is provided respectively with a part of a pair of arm support portions located opposite to each other in the width direction to support a pair of suspension arms correspondingly. Thus, while achieving required collision performance, the vehicle subframe can have an increased strength and rigidity for supporting the suspension arms by receiving a load input applied in the width direction from each of the suspension arms through the pair of mounting members in addition to the cross member.

In the configuration according to the third aspect of the present invention, the pair of side members respectively includes weakened portions on the forward side relative to a pair of intermediate vehicle-body mounting portions. The weakened portions are deformable against an impact force applied toward the rearward side. The lower side members of the pair of side members respectively include reinforcement portions continuously connecting the pair of intermediate vehicle-body mounting portions and a pair of rear vehicle-body mounting portions correspondingly in the forward-rearward direction. The reinforcement portions have a shape protruding in the upward direction or the downward direction in cross-section taken along the plane parallel to the plane defined by the upward-downward direction and the width direction. This configuration can increase the strength and rigidity of the vehicle subframe, and the weakened portions of the pair of side members are deformed by an impact force applied at the time of, typically, front collision of the vehicle, while the reinforcement portions are not deformed. Thus, a part of the impact force can be absorbed by the weakened portions, and this ensures that the remaining impact force can be transmitted to the vehicle body in a distributed manner through the cross member, the pair of vehicle-body mounting members, and a portion of the pair of side members located on the rearward side relative to the pair of vehicle-body mounting members. This can reduce the occurrence of undesirable deformation and crush of the vehicle subframe, and can consequently exhibit required collision performance.

In the configuration according to the fourth aspect of the present invention, opposite end portions of a lower cross member in the width direction extend in the forward-rearward direction respectively along the reinforcement portions of the lower side members of the pair of side members, and constitute a pair of bulkhead portions, each of which extends toward the upward side, and upper end portions of the pair of bulkhead portions in the upward-downward direction are respectively joined to an upper cross member. This configuration can increase the strength and rigidity of the vehicle subframe on the rearward side relative to the weakened portions of the pair of side members, and further ensures that an impact force applied at the time of, typically, front collision of the vehicle can be transmitted to the vehicle body in a distributed manner.

In the configuration according to the fifth aspect of the present invention, in cross-section taken along the plane parallel to the plane defined by the upward-downward direction and the width direction, the vehicle subframe has a closed cross-section defined by the upper cross member, the lower cross member, and the pair of bulkhead portions in cooperation with each other, a closed cross-section defined by the upper cross member, one of the lower side members of the pair of side members, and one of the pair of bulkhead portions in cooperation with each other, and a closed cross-section defined by the upper cross member, the other one of the lower side members of the pair of side members, and the other one of the pair of bulkhead portions in cooperation with each other. This configuration can more significantly increase the strength and rigidity of the vehicle subframe on the rearward side relative to the weakened portions of the pair of side members, and further ensures that an impact force applied at the time of, typically, front collision of the vehicle can be transmitted to the vehicle body in a distributed manner.

DETAILED DESCRIPTION OF THE PREFERRED EMBODIMENT

Figure 1:
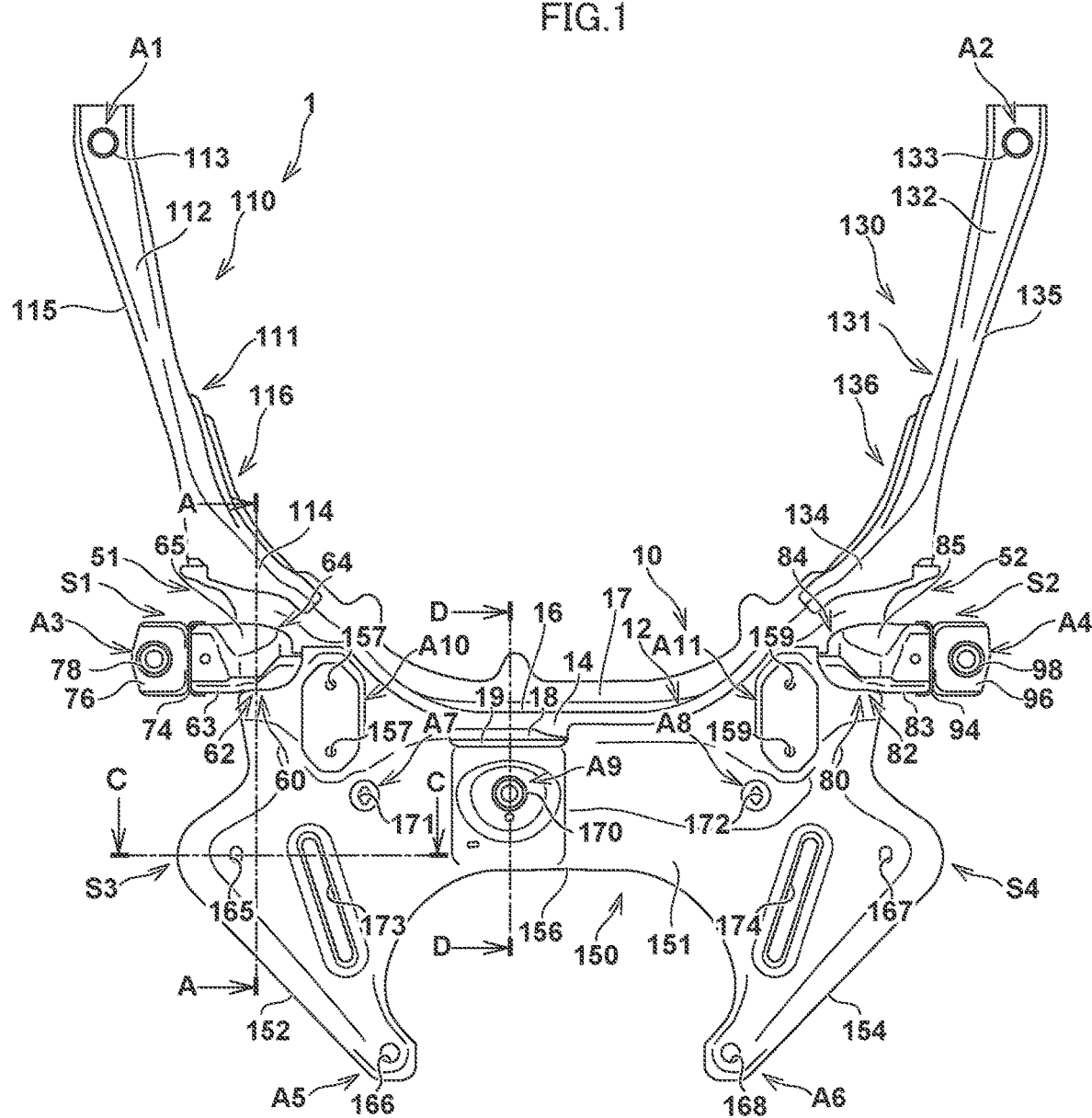
FIG. 1 is a plan view showing a configuration of a vehicle subframe according to an embodiment of the present invention.
Figure 1:
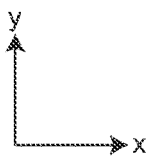

A vehicle subframe according to an embodiment of the present invention will be explained below in detail with reference to FIGS. 1 to 7. In the drawings, an x-axis, a y-axis, and a z-axis form a triaxial orthogonal coordinate system. The positive direction of the x-axis is a right direction of a vehicle body, the positive direction of the y-axis is a front direction of the vehicle body, and the positive direction of the z-axis is an upper direction of the vehicle body. An x-axis direction is referred to as a width direction or a lateral direction, a y-axis direction is referred to as a front-rear direction, and a z-axis direction is referred to as a vertical direction in some cases.

Figure 2:
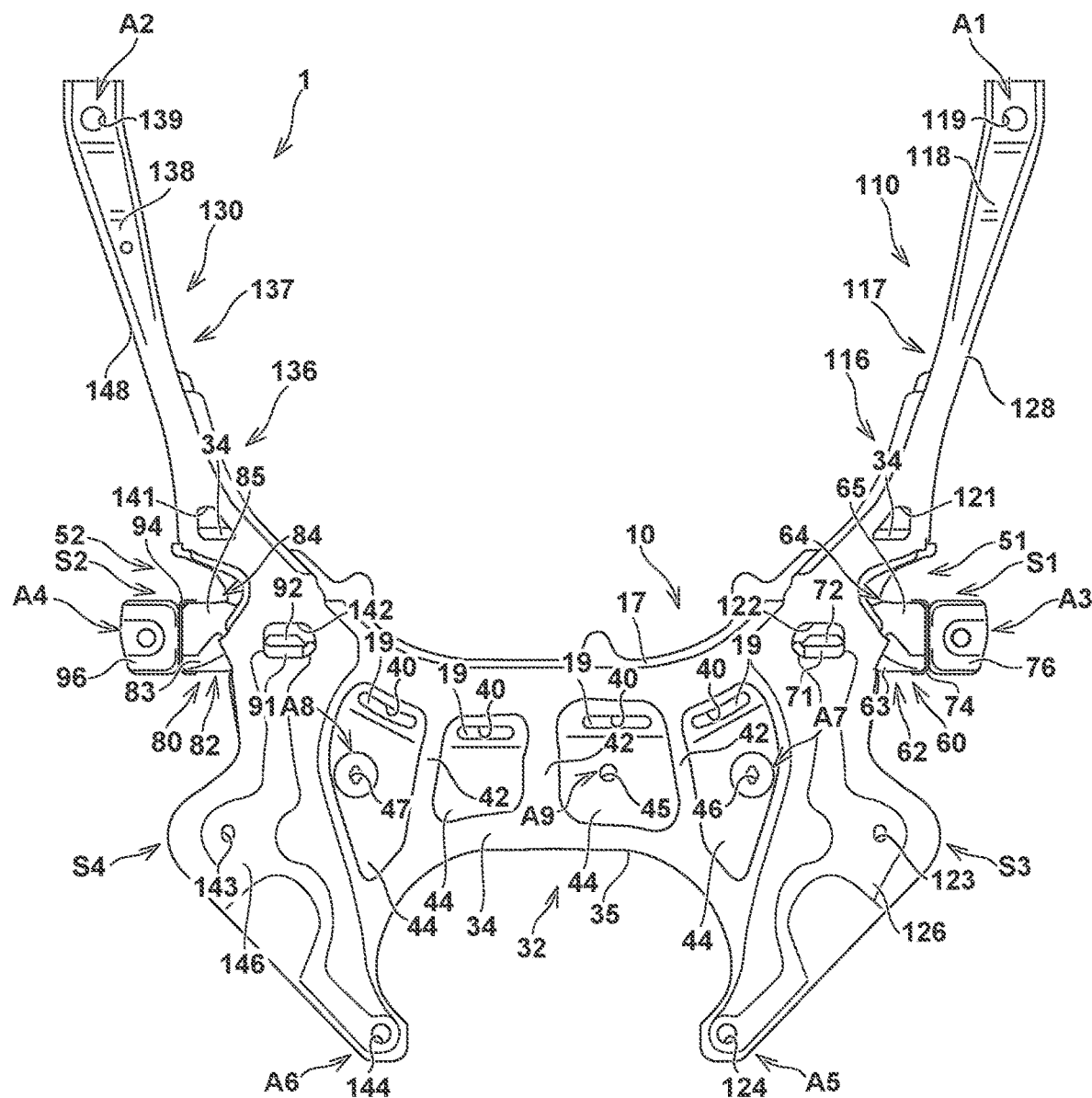
FIG. 2 is a bottom view showing a configuration of the vehicle subframe according to the embodiment.
Figure 3:
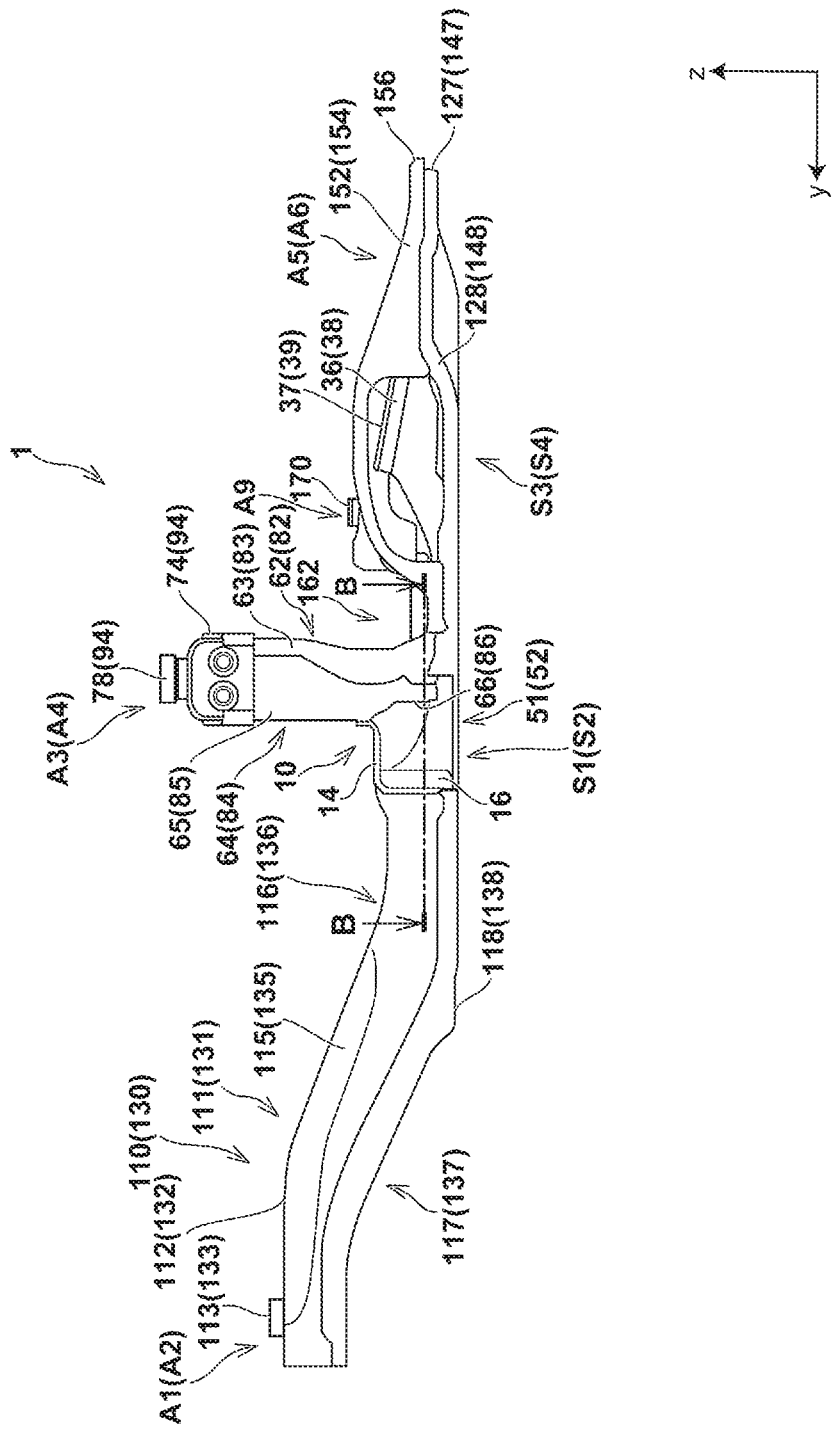
FIG. 3 is a left side view showing a configuration of the vehicle subframe according to the embodiment.
Figure 4:
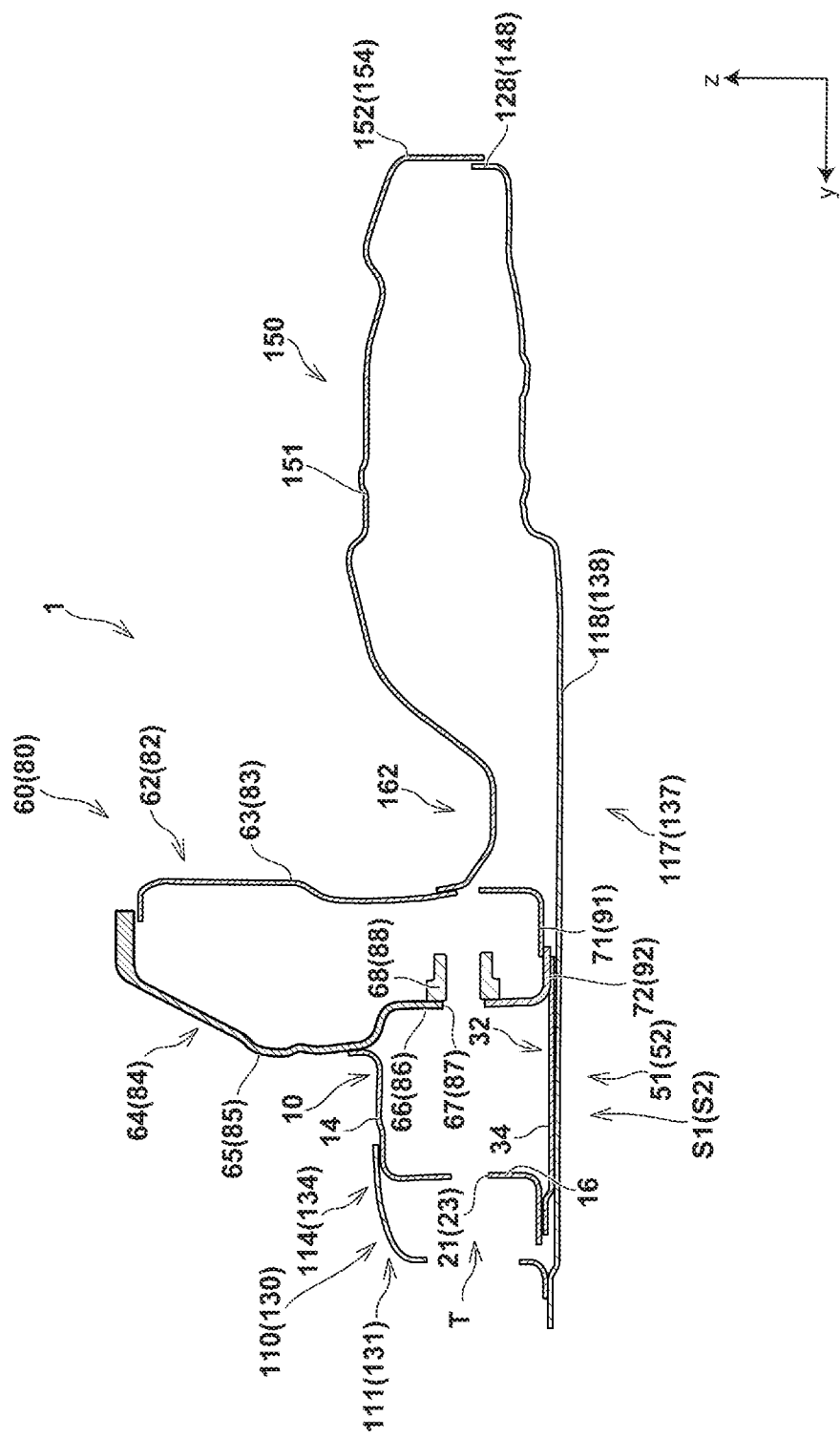
FIG. 4 is an A-A cross-sectional view of FIG. 1.
Figure 5:
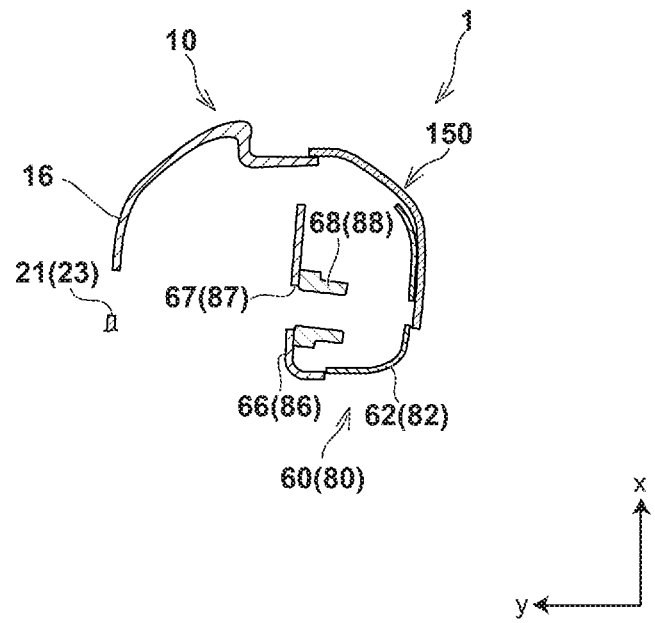
FIG. 5 is a B-B cross-sectional view of FIG. 3.
Figure 6:
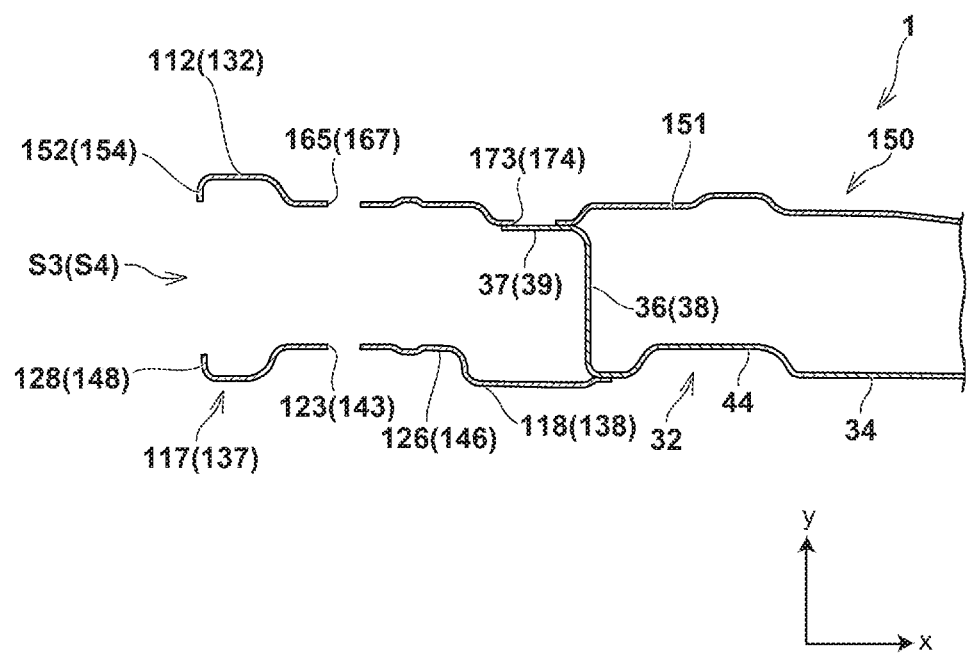
FIG. 6 is a C-C cross-sectional view of FIG. 1.
Figure 7:
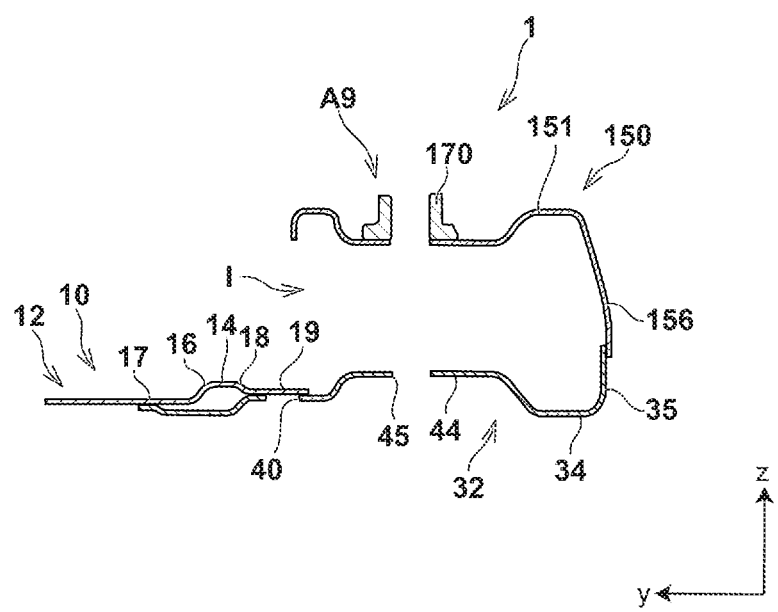
FIG. 7 is a D-D cross-sectional view of FIG. 1.

FIG. 1, FIG. 2, and FIG. 3 are a plan view, a bottom view, and a left side view, respectively, showing a configuration of the vehicle subframe according to the present embodiment. FIG. 4 and FIG. 7 are an A-A cross-sectional view and a D-D cross-sectional view of FIG. 1, respectively, each of which is a vertical cross-sectional view taken along the plane parallel to the y-z plane defined by the y-axis and the z-axis. FIG. 5 is a B-B cross-sectional view of FIG. 3 that is a horizontal cross-sectional view taken along the plane parallel to the x-y plane defined by the x-axis and the y-axis. FIG. 6 is a C-C cross-sectional view of FIG. 1 that is a vertical cross-sectional view taken along the plane parallel to the x-z plane defined by the x-axis and the z-axis. For convenience of explanation, in FIGS. 3 to 6, some of the right-side constituent elements of the vehicle subframe are denoted by reference signs in parentheses along with the reference signs for the left-side constituent elements as needed.

As shown in FIGS. 1 to 7, a subframe 1 supports suspension arms and the like while being attached to a vehicle body such as a front side frame defining a front engine bay of a vehicle such as an automobile, although illustrations thereof are omitted. Typically, the subframe 1 has a laterally symmetrical (plane-symmetrical) shape with respect to the plane parallel to the y-z plane and passing along the center line extending in the forward-rearward direction at the center of the vehicle body in the width direction thereof.

In the subframe 1, six portions are provided as a section to be attached to the vehicle body, including a first vehicle-body mounting portion A1, a second vehicle-body mounting portion A2, a third vehicle-body mounting portion A3, a fourth vehicle-body mounting portion A4, a fifth vehicle-body mounting portion A5, and a sixth vehicle-body mounting portion A6. In addition, in the subframe 1, four portions are provided as a section to support the suspension arms, including a first support portion S1, a second support portion S2, a third support portion S3, and a fourth support portion S4. These portions are described later in detail.

In the subframe 1, mounting portions used for fitting various types of parts applied with external forces are provided. Various types of the mounting portions include a steering gearbox left mounting portion A7, a steering gearbox right mounting portion A8, a torque rod mounting portion A9, a stabilizer left mounting portion A10, and a stabilizer right mounting portion A11. These mounting portions are described later in detail.

Specifically, the subframe 1 mainly includes a cross member 10 disposed to extend in the width direction, a left mounting member 60 connected with the cross member 10 and disposed on the side of the left end portion of the cross member 10, a right mounting member 80 connected with the cross member 10 and disposed on the side of the right end portion of the cross member 10, and a left side member 110 and a right side member 130 that are a pair of side members connected with the cross member 10 and with the left mounting member 60 and the right mounting member 80, and disposed opposite to each other in the width direction while extending in the forward-rearward direction. Each of these members is obtained by press-forming a single flat-plate member of, typically, steel sheet. These members are welded by arc welding, plug welding, or other welding processes and joined into an integral piece with their overlapping portions on one another and the butting portions against one another brought into contact with each other correspondingly, so that the subframe 1 basically has a closed cross-sectional shape.

The cross member 10 includes an upper member 12 extending in the width direction, a lower member 32 disposed to extend in the width direction while being opposed to the upper member 12 on the downward side relative to the upper member 12, the lower member 32 being welded to the upper member 12 by, typically, arc welding or plug welding into an integral piece, and a rear upper member 150 disposed on the rearward side of the upper member 12 and opposed to the lower member 32 on the upward side relative to the lower member 32, the rear upper member 150 being welded to the upper member 12 and the lower member 32 by, typically, arc welding or plug welding into an integral piece. The upper member 12 and the rear upper member 150 correspond to an upper cross member, while the lower member 32 corresponds to a lower cross member. In the cross member 10, the closed cross-section (vertical closed cross-section) is defined continuously in the width direction in cross-section taken along the plane parallel to the y-z plane by the upper member 12 and the lower member 32 integrated with each other. Also, the closed cross-section (vertical closed cross-section) is defined continuously in the forward-rearward direction in cross-section taken along the plane parallel to the x-z plane by the rear upper member 150 integrated with the upper member 12 and the lower member 32. It is preferable for the cross member 10 that the thickness of the upper member 12 is set greater than the thickness of the lower member 32 and the thickness of the rear upper member 150 from the viewpoint of ensuring a sufficient strength and rigidity of the upper member 12. Although the formability becomes lower, the upper member 12, the lower member 32, and the rear upper member 150 may not be formed from separate plate members of steel sheet, but it is allowable that, on an as-needed basis, these members are formed from a single plate member of steel sheet into which these separate plate members are unified in their entirety, or are formed from a plurality of plate members of steel sheet in each of which these separate members are appropriately combined into a unified member.

The upper member 12 is a plate member basically having a shape protruding in the upward direction, and includes an upper wall portion 14 located on the upward side of the upper member 12, a front wall portion 16 extending downward from the front end port ion of the upper wall portion 14, and a rear wall portion 18 extending downward from the rear end portion of the upper wall portion 14, and opposed to the front wall portion 16 on the rearward side relative to the front wall portion 16. The upper wall portion 14 and the front wall portion 16 are provided substantially over the entire length of the upper member 12 in the width direction. The rear wall portion 18 disappears not to extend substantially at an intermediate portion from the intermediate portion of the upper member 12 in the width direction to the opposite outer end portions thereof that are the left end portion and the right end portion. The opposite outer end portions of the front wall portion 16 in the width direction, that is, the left end portion and the right end portion of the front wall portion 16 are formed respectively with through holes 21 and 23 passing through these left and right end portions correspondingly. A flange portion 17 is provided at the front end portion of the front wall portion 16. The flange portion 17 has a flat plate-like shape and protrudes in the forward direction. A flange portion 19 is provided at the rear end portion of the rear wall portion 18. The flange portion 19 has a flat plate-like shape and protrudes in the rearward direction.

The lower member 32 is a plate member basically having a shape protruding in the downward direction, and includes a bottom wall portion 34 located on the downward side of the lower member 32, a rear wall portion 35 extending upward from the rear end portion of the bottom wall portion 34, and bulkhead portions 36 and 38 that are vertical wall portions extending upward respectively from the left end portion and the right end portion of the bottom wall portion 34. The bottom wall portion 34 and the rear wall portion 35 are provided over the entire length of the lower member 32 in the width direction. A flange portion 37 is provided at the upper end portion of the bulkhead portion 36. The flange portion 37 has a flat plate-like shape and protrudes from the upper end portion of the bulkhead portion 36 in the leftward direction. A flange portion 39 is provided at the upper end portion of the bulkhead portion 38. The flange portion 39 has a flat plate-like shape and protrudes from the upper end portion of the bulkhead portion 38 in the rightward direction.

A welding hole 40 is formed at a portion of the bottom wall portion 34 on the forward side relative to the central portion thereof in the forward-rearward direction. The welding hole 40 passes through the bottom wall portion 34. The welding hole 40 is an elongated hole portion elongated in the width direction, through which a hole peripheral edge of the welding hole 40 and the flange portion 19 of the upper member 12 are welded by arc welding or other welding processes with the flange portion 19 of the upper member 12 brought into contact with a portion of the bottom wall portion 34 surrounding the welding hole 40. The hole peripheral edge is welded to the flange portion 19 in this manner, and the bottom wall portion 34 of the lower member 32 and the flange portion 17 of the upper member 12 are welded by arc welding or other welding processes, so that the lower member 32 is integrated with the upper member 12. It is preferable that a plurality of the welding holes 40 are provided such that the upper member 12 and the lower member 32 can be welded at plural locations in a distributed manner. It is allowable that the bottom wall portion 34 is provided with rib portions 42 between the adjacent welding holes 40. Each of the rib portions 42 is a reinforcement portion having a shape protruding from the bottom wall portion 34 in the downward direction. In this case, taking into account the formability and other factors of the plate member, it is preferable that the bottom wall portion 34 around the welding holes 40 constitutes protruding portions 44 having a shape protruding in the upward direction. A closed cross-section is defined by welding the upper member 12 and the lower member 32 into an integral piece. Specifically, the closed cross-section is defined continuously in the width direction by the upper wall portion 14, the front wall portion 16, and the rear wall portion 18 of the upper member 12 and by the bottom wall portion 34 of the lower member 32. It is allowable that the rib portion 42 has a shape protruding in the upward direction, or the rib portion 42 is provided on the upper member 12 at the portion other than the overlapping portion of the flange portion 19 of the upper member 12 on the welding hole 40. It is allowable that the welding hole 40 is welded not only at the hole peripheral edge thereof, but is also welded so as to seal the welding hole 40 in its entirety by plug welding. It is also allowable that only a part of the hole peripheral edge is welded.

On the rearward side of the bottom wall portion 34 relative to the welding holes 40, through holes 45, 46, and 47 are formed, each of which passes through the bottom wall portion 34. In the width direction, the through hole 45 is interposed between the through hole 46 located on the left side of the through hole 45 and the through hole 47 located on the right side of the through hole 45.

On the side of the left end portion of the cross member 10, a left open end portion 51 is provided into which a left-side suspension member (not shown) is fitted. On the side of the right end portion of the cross member 10, a right open end portion 52 is provided into which a right-side suspension member (not shown) is fitted. That is, the left open end portion 51 and the right open end portion 52 are provided on the side of the opposite outer end portions of the cross member 10 in the width direction.

On the side of the laterally opposite outer end portions of the cross member 10 in the width direction, the left mounting member 60 and the right mounting member 80 are disposed in a manner corresponding to the left open end portion 51 and the right open end portion 52. The left mounting member 60 and the right mounting member 80 are a pair of mounting members for mounting the subframe 1 to the vehicle body.

The left mounting member 60 includes a left rear member 62, a left front member 64, a left bracket 74, and a left fixed member 76. The left rear member 62 includes a peripheral wall portion 63 mainly surrounding the opposite sides in the width direction, the rearward side, and the upward side of the left mounting member 60, and a bottom wall portion 71 connected to the peripheral wall portion 63 and closing the downward side of the left mounting member 60. The left rear member 62 is disposed on the side of the left end portion of the cross member 10 while basically protruding in the leftward direction and the upward direction. While having a shape that is matched with and joined to the left rear member 62, the left front member 64 includes a peripheral wall portion 65 mainly surrounding the opposite sides in the width direction, the forward side, and the upward side of the left mounting member 60, and a bottom wall portion 72 connected to the peripheral wall portion 65 and closing the downward side of the left mounting member 60. The left front member 64 is disposed corresponding to the left rear member 62 on the forward side relative to the left rear member 62. The left bracket 74 is disposed at the left end portion of the left rear member 62 and the left front member 64. The left fixed member 76 is fixed to the left rear member 62 and the left front member 64 through the left bracket 74. Each of these members is obtained by press-forming a single flat-plate member of, typically, steel sheet. Each of these members may not be a plate member of steel sheet or the like, but it is allowable that, on an as-needed basis, these members are formed into a single cast product or die-cast product in their entirety.

The left rear member 62, the left front member 64, and the left bracket 74 are integrated by correspondingly welding the peripheral wall portions 63 and 65 to each other and welding the bottom wall portions 71 and 72 to each other by, typically, arc welding to thereby define a closed space within the left mounting member 60. In the left mounting member 60, a closed cross-section is defined in vertical cross-section taken along the plane parallel to the x-z plane, and is continuous in the width direction, a closed cross-section is defined in vertical cross-section taken along the plane parallel to the y-z plane and is continuous in the forward-rearward direction, and a closed cross-section is defined in horizontal cross-section taken along the plane parallel to the x-y plane and is continuous in the upward-downward direction. The left fixed member 76 is fastened with a bolt 77 and fixed to the left rear member 62 and the left front member 64 through the left bracket 74. In the left fixed member 76, a collar member 78 is fixedly provided. The collar member 78 is a cylindrical member typically made of metal for which a bolt for mounting to the vehicle body is inserted through a through hole passing through the left fixed member 76, although illustrations of the bolt and through hole are appropriately omitted. Although the formability becomes lower, it is allowable that on an as-needed basis, the left rear member 62 and the left front member 64 are not formed from separate plate members of steel sheet or the like, but these members may be formed from a single plate member of steel sheet or the like by unifying these members in their entirety. The description "the internal space of the left mounting member 60 is closed" does not mean that the internal space of the left mounting member 60 is brought into a completely sealed state, but means that while the presence of a gap between the mating portions of the plate members or the presence of hole portions such as a hole for coating and an air vent is allowed, the internal space of the left mounting member 60 is closed at the portion other than these gap and hole portions.

The bottom wall portion 72 of the left front member 64 is welded by arc welding or other welding processes on the upward side of the bottom wall portion 34 of the lower member 32 of the cross member 10 with the overlapping portion of the bottom wall portion 72 on the bottom wall portion 34 in contact with the bottom wall portion 34. The peripheral wall portion 65 of the left front member 64 includes a front wall portion 66 with its flat-surface portion directed in the forward direction. The front wall portion 66 is formed with a through hole 67 passing through the front wall portion 66. A nut 68 is fixedly provided for the through hole 67, and extends in the rearward direction from the front wall portion 66. As a left-front first support portion S1 that supports the suspension arm in the manner as described above, the left open end portion 51 is applied, the left open end portion 51 including the upper member 12 of the cross member 10 and the left front member 64 constituting a part of the closed cross-section of the left mounting member 60. This makes it possible to increase the strength and rigidity for supporting the suspension arm.

As compared to the configuration related to the left mounting member 60, the configuration related to the right mounting member 80 disposed on the side of the right end portion of the cross member 10 is laterally symmetrical with respect to the plane parallel to the y-z plane and passing along the center line extending in the forward-rearward direction at the center of the vehicle body in the width direction. Thus, the detailed descriptions of the configuration related to the right mounting member 80 are omitted. Corresponding to the left mounting member 60 including the left rear member 62, the peripheral wall portion 63, the left front member 64, the peripheral wall portion 65, the front wall portion 66, the through hole 67, the nut 68, the bottom wall portions 71 and 72, the left bracket 74, the left fixed member 76, the bolt 77, and the collar member 78, the right mounting member 80 includes a right rear member 82, a peripheral wall portion 83, a right front member 84, a peripheral wall portion 85, a front wall portion 86, a through hole 87, a nut 88, bottom wall portions 91 and 92, a right bracket 94, a right fixed member 96, a bolt 97, and a collar member 98.

At the left end port ion of the cross member 10, the rear wall portion 18 of the upper member 12 is welded by arc welding or other welding processes in a state of contacting the left front member 64 of the left mounting member 60, while disappearing not to extend substantially at the intermediate portion from the central portion of the cross member 10 to the left end portion thereof. Thus, the left open end portion 51 is defined on the side of the left end portion of the cross member 10 as an open end portion having a rectangular shape and surrounded by the upper wall portion 14 and the front wall portion 16 of the upper member 12, the bottom wall portion 34 of the lower member 32, and the front wall portion 66 of the left mounting member 60. In the left open end portion 51, the front wall portion 16 of the upper member 12 and the front wall portion 66 of the left mounting member 60 are both flat plate portions and opposed to each other. That is, the front wall portion 16, which is one of the opposed front wall portions as described above, is formed with the through hole 21 passing through the front wall portion 16, while the front wall portion 66 of the left mounting member 60 opposed to the front wall portion 16 is formed with the through hole 67 passing through the front wall portion 66 corresponding to the through hole 21 on the front wall portion 16. The nut 68 is fixedly provided for the through hole 67 so as to extend from the front wall portion 66 in the rearward direction.

As compared to the configuration related to the left open end portion 51, the configuration related to the right open end portion 52 defined on the side of the right end portion of the cross member 10 is laterally symmetrical with respect to the plane parallel to the y-z plane and passing along the center line extending in the forward-rearward direction at the center of the vehicle body in the width direction. Thus, the detailed descriptions of the configuration related to the right open end portion 52 are omitted. The right open end portion 52 is a rectangular-shaped open end portion surrounded by the upper wall portion 14 and the front wall portion 16 of the upper member 12, the bottom wall portion 34 of the lower member 32, and the front wall portion 86 of the right mounting member 80. The right open end portion 52 includes a through hole 23, the through hole 87, and the nut 88 corresponding to the through hole 21, the through hole 67, and the nut 68 included in the left open end portion 51.

The rear upper member 150 is a plate member basically having a shape protruding in the upward direction, and includes an upper wall portion 151 located on the upward side of the rear upper member 150, a left side wall portion 152 extending downward from the left end portion of the upper wall portion 151, a right side wall portion 153 extending downward from the right end portion of the upper wall portion 151, and a rear wall portion 156 extending downward from the rear end portion of the upper wall portion 151. In the rear upper member 150, the intermediate portion of the front end portion of the upper wall portion 151 overlaps on the rear end portion of the upper wall portion 14 of the upper member 12 of the cross member 10 from the upward side relative to the upper wall portion 14. The left front end portion of the rear upper member 150 overlaps on the peripheral wall portion 63 of the left rear member 62 of the left mounting member 60 from the upward side relative to the peripheral wall portion 63. The right front end portion of the rear upper member 150 overlaps on the peripheral wall portion 83 of the right rear member 82 of the right mounting member 80 from the upward side relative to the peripheral wall portion 83. The left side wall portion 152 and the right side wall portion 153, each of which extends in the forward-rearward direction, overlap on a left-side side wall portion 128 of a left lower member 117 of the left side member 110 and a right-side side wall portion 148 of a right lower member 137 of the right side member 130 correspondingly. The overlapping portions of the rear upper member 150 are welded correspondingly in the manner as described above by, typically, arc welding, so that the rear upper member 150 is integrated with the upper member 12, the left mounting member 60, the right mounting member 80, the left side member 110, and the right side member 130. It is allowable that the laterally opposite end port ions of the rear wall portion 156 extending in the width direction of the rear upper member 150 are welded correspondingly to a rear wall portion 127 of the left lower member 117 of the left side member 110 and to a rear wall portion 147 of the right lower member 137 of the right side member 130 by arc welding or other welding processes.

The rear upper member 150 is formed with a pair of through holes 157 and 157 and a pair of through holes 159 and 159, each of which passes through the upper wall portion 151. The pair of through holes 157 and 157 is aligned in the forward-rearward direction on the diagonally right rearward side of the left mounting member 60. The pair of through holes 159 and 159 is aligned in the forward-rearward direction on the diagonally left rearward side of the right mounting member 80. Corresponding to the pair of through holes 157 and 157 and the pair of through holes 159 and 159, recessed portions 162 and 164 are provided into which a stabilizer bar (not shown) is insertable in the width direction. The recessed portions 162 and 164 are formed extending in the width direction while being recessed in the downward direction from a part of the upper wall portion 151. The rear upper member 150 is formed with a through hole 165, a through hole 166, a through hole 167, and a through hole 168, each of which passes through the upper wall portion 151. On the diagonally left rearward side of the pair of through holes 157 and 157, the through hole 165 is opposed on the upward side to a through hole 123 on the left lower member 117. On the diagonally right rearward side of the through hole 165, the through hole 166 is opposed on the upward side to a through hole 124 on the left lower member 117. On the diagonally right rearward side of the pair of through holes 159 and 159, the through hole 167 is opposed on the upward side to a through hole 143 on the right lower member 137. On the diagonally left rearward side of the through hole 167, the through hole 168 is opposed on the upward side to a through hole 144 on the right lower member 137. It is allowable that a collar member (not shown) that is a cylindrical member typically made of metal is fixedly provided inside the cross member 10 corresponding to the through holes 166 and 124, and corresponding to the through holes 168 and 144. The rear upper member 150 is formed with a through hole 171 and a through hole 172, each of which passes through the upper wall portion 151. The through hole 171 is located on the diagonally right rearward side of the pair of through holes 157 and 157, and is opposed on the upward side to the through hole 46 on the lower member 32. The through hole 172 is located on the diagonally left rearward side of the pair of through holes 159 and 159, and is opposed on the upward side to the through hole 47 on the lower member 32. It is allowable that a collar member (not shown) that is a cylindrical member typically made of metal is fixedly provided inside the cross member 10 corresponding to the through holes 171 and 46, and corresponding to the through holes 172 and 47. In the rear upper member 150, a nut 170 is fixedly provided to the upper wall portion 151 in between the through holes 171 and 172 in the width direction, corresponding to a through hole (not shown) passing through the upper wall portion 151 and opposed on the upward side to the through hole 45 on the lower member 32. On the forward side relative to the nut 170, an opening portion is provided between the upper wall portion 151, and the upper wall portion 14 and the flange portion 19 of the upper member 12 and the bottom wall portion 34 of the lower member 32. An attachment opening portion I is defined with the interior space of the cross member 10 being opened outward. A bracket that is the engine and transmission-system mounting member (not shown) passes through the upward side of the closed cross-section defined continuously in the width direction by the upper wall portion 14, the front wall portion 16, and the rear wall portion 18 of the upper member 12, and by the bottom wall portion 34 of the lower member 32 via the attachment opening portion I, so that it is possible for an insulator bush that is the mounting member to reach the position of the through hole 45 on the lower member 32 and the position of the nut 170 on the upper wall portion 151.

The rear upper member 150 is formed with a welding hole 173 and a welding hole 174, each of which passes through the upper wall portion 151. The welding hole 173 is an elongated hole portion elongated in the forward-rearward direction while diagonally extending to the right side in the rearward direction on the rightward side relative to the through hole 165. The welding hole 174 is an elongated hole portion elongated in the forward-rearward direction while diagonally extending to the left side in the rearward direction on the leftward side relative to the through hole 167. The flange portion 37 of the bulkhead portion 36 of the lower member 32 is brought into contact with a portion of the upper wall portion 151 surrounding the welding hole 173. In this state, the hole peripheral edge of the welding hole 173 and the flange portion 37 of the bulkhead portion 36 of the lower member 32 are welded by arc welding or other welding processes. The flange portion 39 of the bulkhead portion 38 of the lower member 32 is brought into contact with a portion of the upper wall portion 151 surrounding the welding hole 174. In this state, the hole peripheral edge of the welding hole 174 and the flange portion 39 of the bulkhead portion 38 of the lower member 32 are welded by arc welding or other welding processes. Along with that, in the rear upper member 150, the intermediate portion of the rear wall portion 156 extending in the width direction is welded to the rear wall portion 35 of the lower member 32 by arc welding or other welding processes. The rear upper member 150 is welded in this manner, so that the rear upper member 150 is integrated with the lower member 32, and in vertical cross-section taken along the plane parallel to the x-z plane, the closed cross-section is defined by the upper wall portion 151, the bottom wall portion 34 of the lower member 32, and the bulkhead portions 36 and 38 of the lower member 32. It is allowable that each of the welding holes 173 and 174 is welded not only at the hole peripheral edge thereof, but is also welded so as to seal each of the welding holes 173 and 174 in its entirety by plug welding. It is also allowable that only a part of the hole peripheral edge is welded.

The left side member 110 includes a left upper member 111 and the left lower member 117. The left upper member 111 is a plate member extending in the forward-rearward direction on the leftward side while basically having a protruding shape protruding in the upward direction. The left upper member 111 includes an upper wall portion 112 and a pair of side wall portions 115 extending downward from the laterally opposite end portions of the upper wall portion 112. The left lower member 117 is a plate member disposed opposite to the left upper member 111 on the downward side relative to the left upper member 111, and extending in the forward-rearward direction while basically having a protruding shape protruding in the downward direction. The left lower member 117 includes a bottom wall portion 118 and a pair of side wall portions 128 extending upward from the laterally opposite end portions of the bottom wall portion 118. The left upper member 111 corresponds to a left upper side member. The left lower member 117 corresponds to a left lower side member. The left upper member 111 and the left lower member 117 are integrated by welding their corresponding wall portions, such as the side wall portions 115 and 128, to each other by, typically, arc welding. In a portion of the left lower member 117 overlapping on the cross member 10, the left mounting member 60, and the right mounting member 80 in the upward-downward direction, the side wall portion 128 on the right side of the pair of side walls 128 does not extend substantially. It is allowable that in the left side member 110, the left upper member 111 and the left lower member 117, particularly, the left lower member 117 that is elongated in the forward-rearward direction is divided into the forward part and the rearward part in consideration of the yield of the plate member. Although the formability becomes lower, the left upper member 111 and the left lower member 117 may not be formed from separate plate members of steel sheet or the like, but it is allowable that, on an as-needed basis, these members are formed from a single plate member of steel sheet or the like or from a cylindrical member by unifying these members in their entirety.

In the left upper member 111, a collar member 113 is fixedly provided at the front end portion of the upper wall portion 112 corresponding to a through hole (not shown) passing through the upper wall portion 112. The collar member 113 is a cylindrical member typically made of metal. The left upper member 111 also includes a connection portion 114 at the rear end of the upper wall portion 112. The left upper member 111 is integrated with the cross member 10 by correspondingly welding the connection portion 114 to the front wall portion 16 of the upper member 12 of the cross member 10 from the forward side by, typically, arc welding. The left upper member 111 includes a portion on the forward side adjacent to the connection portion 114 with the cross-sectional area of this portion in vertical cross-section taken along the plane parallel to the x-z plane being reduced in the upward-downward direction. The portion as described above corresponds to a part of a weakened portion 116. In the side wall portion 128 on the leftward side of the pair of side walls 128, a fastening opening portion T is defined with the interior space of the left side member 110 opened outward such that a bolt can be fastened by being inserted through the through hole 21 in the left open end portion 51, and the through hole 67 and the nut 68.

The lower left member 117 includes the front end portion opposed on the downward side to the front end portion of the left upper member 111, and the rear wall portion 127 that is the rear end portion opposed on the downward side to the rear wall portion 156 at the rear end portion of the rear upper member 150. The bottom wall portion 118 extends in the forward-rearward direction while coming into contact with the bottom wall portion 34 of the lower member 32 of the cross member 10 on the downward side relative to the bottom wall portion 34. The left lower member 117 includes a through hole 119 passing through the bottom wall portion 118 at the front end portion of the left lower member 117, and also includes welding holes 121 and 122 and through holes 123 and 124 positioned toward the rearward direction from the through hole 119 in the order described. Each of the welding holes 121 and 122 and the through holes 123 and 124 passes through the bottom wall portion 118.

The through hole 119 is opposed on the downward side to the collar member 113 of the left upper member 111. It is allowable that a collar member (not shown) that is a cylindrical member typically made of metal is fixedly provided inside the left side member 110 corresponding to the collar member 113 and the through hole 119. The welding hole 121 is a hole portion with its width on the rearward side increased relative to its width on the forward side for welding the hole peripheral edge of the welding hole 121 and the bottom wall portion 34 of the lower member 32 of the cross member 10 by arc welding or other welding processes in a state where the bottom wall portion 34 of the lower member 32 of the cross member 10 is brought into contact with a portion of the bottom wall portion 118 surrounding the welding hole 121. The left lower member 117 and the lower member 32 of the cross member 10 are integrated by welding the hole peripheral edge in the manner as described above, and by welding the right end portion of the bottom wall portion 118 to the left end portion of the lower member 32 of the cross member 10. In this case, the bottom wall portion 118 and the upper wall portion 151 of the rear upper member 150 of the cross member 10 are partitioned by the bulkhead portion 36 of the lower member 32 of the cross member 10. Thus, in vertical cross-section taken along the plane parallel to the x-z plane, the closed cross-section is defined by the bottom wall portion 118, the side wall portion 128, the upper wall portion 151 and the left side wall portion 152 of the rear upper member 150 of the cross member 10, and the bulkhead portion 36 of the lower member 32 of the cross member 10. The welding hole 122 is a hole portion through which the hole peripheral edge of the welding hole 122 is welded to the bottom wall portion 71 of the left rear member 62 of the left mounting member 60 and to the bottom wall portion 72 of the left front member 64 of the left mounting member 60 by arc welding or other welding processes in a state where the bottom wall portion 71 of the left rear member 62 of the left mounting member 60 and the bottom wall portion 72 of the left front member 64 of the left mounting member 60 are brought into contact with a portion of the bottom wall portion 118 surrounding the welding hole 122. The left lower member 117 and the left mounting member 60 are integrated by welding the hole peripheral edges in the manner as described above. Due to the integration as described above and the configuration in which the closed cross-section is formed, the strength and rigidity of the subframe 1 can be increased, and the left lower member 117 and the left mounting member 60 have an integrated configuration. This makes it possible to ensure that an impact force applied at the time of, typically, front collision of the vehicle is transmitted to the vehicle body in a distributed manner through the cross member 10 and the pair of vehicle-body mounting members 60 and 80. It is allowable that in the welding hole 121, the upper member 12 of the cross member 10 is also welded in addition to the bottom wall portion 34 of the lower member 32 of the cross member 10. It is allowable that in the welding hole 122, the lower member 32 of the cross member 10 is also welded in addition to the bottom wall portion 71 of the left rear member 62 of the left mounting member 60 and the bottom wall portion 72 of the left front member 64 of the left mounting member 60. It is allowable that each of the welding holes 121 and 122 is welded not only at the hole peripheral edge thereof, but is also welded so as to seal each of the welding holes 121 and 122 in its entirety by plug welding. It is also allowable that only a part of the hole peripheral edge is welded.

Between the welding hole 122 and the through hole 124, a reinforcement portion 126 is provided extending so as to continuously connect the welding hole 122 and the through hole 124 in the forward-rearward direction. The reinforcement portion 126 has a protruding shape formed by protruding the bottom wall portion 118 of the left lower member 117 in the upward direction. In the forward-rearward direction, the position of the welding hole 122 corresponds to the position of the collar member 78 of the left mounting member 60, that is, the position of the third vehicle-body mounting portion A3, and the position of the through hole 124 corresponds to the position of the fifth vehicle-body mounting portion A5. This means that the reinforcement portion 126 extends so as to continuously connect the third vehicle-body mounting portion A3 and the fifth vehicle-body mounting portion A5 in the forward-rearward direction. The bulkhead portion 36 of the lower member 32 of the cross member 10 is placed adjacent to the reinforcement portion 126 on the rightward side thereof, and extends in the forward-rearward direction along the reinforcement portion 126. Accordingly, the strength of the left lower member 117 is increased more significantly by the bulkhead portion 36 in addition to by the reinforcement portion 126. It is allowable that the reinforcement portion 126 has a protruding shape formed by protruding the bottom wall portion 118 of the left lower member 117 in the downward direction.

A portion of the left lower member 117, opposed on the downward side to a part of the weakened portion 116 of the left upper member 111, corresponds to a part of the weakened portion 116 with the cross-sectional area of this part in vertical cross-section taken along the plane parallel to the x-z plane being reduced in the upward-downward direction. The portion of the left upper member 111 and the portion of the left lower member 117 as described above cooperate with each other to constitute the weakened portion 116 in its entirety on the forward side relative to the third vehicle-body mounting portion A3 and the fourth vehicle-body mounting portion A4. The weakened portion 116 as described above is deformable in such a required deformation mode that the weakened portion 116 is bent toward the downward direction while being crushed in the forward-rearward direction by an impact force applied to the left side member 110 at the time of, typically, front collision of the vehicle. The weakened portion 116 is deformed by the impact force applied at the time of the front collision as described above. In contrast to that, the cross member 10, the left mounting member 60, and the reinforcement portion 126 with their increased strength and thus their increased ability to resist against the deformation are located on the rearward side of the weakened portion 116. This makes it possible to absorb a part of the impact force as described above by the weakened portion 116, and ensure that the remaining impact force can be transmitted to the right side member 130 and the vehicle body in a distributed manner through the cross member 10, the left mounting member 60, and the reinforcement portion 126. The left lower member 117 is constituted by a single plate member of steel sheet or the like. However, it is also allowable that, on an as-needed basis, the left lower member 117 is constituted by connecting a plurality of plate members of steel sheet or the like that are divided somewhere along the forward-rearward direction. The plate members as described above may have different thicknesses from each other.

As compared to the configuration related to the left side member 110, the configuration related to the right side member 130 disposed on the right side relative to the left side member 110 and opposed to the left side member 110 in the width direction is laterally symmetrical with respect to the plane parallel to the y-z plane and passing along the center line extending in the forward-rearward direction at the center of the vehicle body in the width direction. Thus, the detailed descriptions of the configuration related to the right side member 130 are omitted. Corresponding to the left side member 110 including the left upper member 111, the upper wall portion 112, the collar member 113, the connection portion 114, the side wall portion 115, the weakened portion 116, the left lower member 117, the bottom wall portion 118, the through hole 119, the welding holes 121 and 122, the through holes 123 and 124, the reinforcement portion 126, the rear wall portion 127, and the side wall portion 128, the right side member 130 includes a right upper member 131, an upper wall portion 132, a collar member 133, a connection portion 134, a side wall portion 135, a weakened portion 136, the right lower member 137, a bottom wall portion 138, a through hole 139, welding holes 141 and 142, the through hole 143, the through hole 144, a reinforcement portion 146, the rear wall portion 147, and the side wall portion 148.

In the configuration described above, among various sections of the subframe 1 to be attached to the vehicle body, the collar member 113 provided in the left upper member 111 of the left side member 110, the through hole 119 provided in the left lower member 117 of the left side member 110, and a collar member (not shown) provided corresponding to the collar member 113 and the through hole 119 correspond to a left-front first vehicle-body mounting portion A1. The collar member 133 provided in the right upper member 131 of the right side member 130, the through hole 139 provided in the right lower member 137 of the right side member 130, and a collar member (not shown) provided corresponding to the collar member 133 and the through hole 139 correspond to a right-front second vehicle-body mounting portion A2. The collar portion 78 provided in the left fixed member 76 of the left mounting member 60 corresponds to a left-middle third vehicle-body mounting portion A3. A collar portion 98 provided in the right fixed member 96 of the right mounting member 80 corresponds to a right-middle fourth vehicle-body mounting portion A4. The through hole 124 provided in the left lower member 117 of the left side member 110, the through hole 166 provided in the rear upper member 150, and a collar member provided corresponding to the through holes 124 and 166 correspond to a left-rear fifth vehicle-body mounting portion A5. The through hole 144 provided in the right lower member 137 of the right side member 130, the through hole 168 provided in the rear upper member 150, and a collar member provided corresponding to the through holes 144 and 168 correspond to a right-rear sixth vehicle-body mounting portion A6. These sections are all fastening sections using a fastening member, typically, a bolt. It is assumed as an example that a rigid structure is employed for these sections, in which a subframe mounting member is not interposed between the subframe 1 and the vehicle body. However, it is allowable that a floating structure is employed in which a subframe mounting member is interposed.

The left open end portion 51 corresponds to the left-front first support portion S1 among various sections, at each of which the subframe 1 supports an inner pivot portion of the suspension arm. The left open end portion 51 includes the through hole 21 on the upper member 12 of the cross member 10, and the through hole 67 and the nut 68 on the left front member 64 of the left mounting member 60. The right open end portion 52 corresponds to a right-front second support portion S2. The right open end portion 52 includes the through hole 23 on the upper member 12 of the cross member 10, and the through hole 87 and the nut 88 on the right front member 84 of the right mounting member 80. The through hole 123 provided in the left lower member 117 of the left side member 110, and the through hole 165 provided in the rear upper member 150 correspond to a left-rear third support portion S3. The through hole 143 provided in the right lower member 137 of the right side member 130, and the through hole 167 provided in the rear upper member 150 correspond to a right-rear fourth support portion S4. These sections are all fastening sections using a fastening member, typically, a bolt. It is assumed as an example that an L-shaped lower arm is employed as a suspension arm applicable to these sections. However, it is allowable that an A-shaped lower arm or two I-shaped lower arms are employed. It is assumed as an example that an inner cylinder of an insulator bush member (not shown) is fastened in each of the left-front first support portion S1, the right-front second support portion S2, the left-rear third support portion S3, and the right-rear fourth support portion S4.

The through hole 171 provided in the rear upper member 150 of the cross member 10, the through hole 46 provided in the lower member 32 of the cross member 10, and a collar member provided corresponding to the these through holes 171 and 46 correspond to the steering gearbox left mounting portion A7 among various mounting portions of the subframe 1 to which various types of parts applied with external forces are fitted. The through hole 172 provided in the rear upper member 150, the through hole 47 provided in the lower member 32, and a collar member provided corresponding to the through holes 172 and 47 correspond to the steering gearbox right mounting portion A8. The nut 170 provided in the upper member 12 of the cross member 10 and the through hole 45 provided in the lower member 32 correspond to the torque rod mounting portion A9. The through holes 157 and 157 provided in the rear upper member 150 correspond to the stabilizer left mounting portion A10. The through holes 159 and 159 provided in the rear upper member 150 correspond to the stabilizer right mounting portion A11. These sections are all fastening sections using a fastening member, typically, a bolt. It is assumed as an example that left and right mounting seats of the steering gearbox body are fastened correspondingly in the steering gearbox left mounting portion A7 and the steering gearbox right mounting portion A8. It is assumed as an example that an inner cylinder of the engine and transmission-system mounting member is fastened in the torque rod mounting portion A9. It is assumed as an example that brackets are respectively fastened in the stabilizer left mounting portion A10 and the stabilizer right mounting portion A11, and the stabilizer bar is fitted into the brackets described above through bush members, although illustrations of these brackets, bush members, and stabilizer bar are omitted.

In the subframe 1 according to the present embodiment described above, the pair of side members 110 and 130 includes the upper side members 111 and 131 and the lower side members 117 and 137, respectively, the lower side members 117 and 137 extending opposed on the downward side to the upper side members 111 and 131 while being elongated to the rearward side, and a pair of mounting members 60 and 80 is joined respectively to the lower side members 117 and 137 of the pair of side members 110 and 130. This configuration can increase the strength and rigidity of the vehicle subframe 1, and can also ensure that an impact force applied at the time of, typically, front collision of the vehicle is transmitted to the vehicle body in a distributed manner through the cross member 10 and the pair of vehicle-body mounting members 60 and 80. This can reduce the occurrence of undesirable deformation and crush of the vehicle subframe 1, and can consequently exhibit required collision performance.

In the subframe 1 according to the present embodiment, the pair of mounting members 60 and 80 is provided respectively with a part of a pair of arm support portions S1 and S2 located opposite to each other in the width direction to support the pair of suspension arms correspondingly. Thus, while achieving required collision performance, the subframe 1 can have an increased strength and rigidity for supporting the suspension arms by receiving a load input applied in the width direction from each of the suspension arms additionally through the pair of vehicle-body mounting members 60 and 80.

In the subframe 1 according to the present embodiment, the pair of side members 110 and 130 respectively includes the weakened portions 116 and 136 on the forward side relative to the pair of intermediate vehicle-body mounting portions A3 and A4. The weakened portions 116 and 136 are deformable against an impact force applied toward the rearward side. The lower side members 117 and 137 of the pair of side members 110 and 130 respectively include the reinforcement portions 126 and 146 continuously connecting the pair of intermediate vehicle-body mounting portions A3 and A4 and the pair of rear vehicle-body mounting portions A5 and A6 correspondingly in the forward-rearward direction. The reinforcement portions 126 and 146 have a shape protruding in the upward direction or the downward direction in cross-section taken along the plane parallel to the plane defined by the upward-downward direction and the width direction. This configuration can increase the strength and rigidity of the subframe 1, and the weakened portions 116 and 136 of the pair of side members 110 and 130 are deformed by an impact force applied at the time of, typically, front collision of the vehicle, while the reinforcement portions 126 and 146 are not deformed. Thus, a part of the impact force can be absorbed by the weakened portions 116 and 136, and this ensures that the remaining impact force can be transmitted to the vehicle body in a distributed manner through the cross member 10, the pair of vehicle-body mounting members 60 and 80, and a portion of the pair of side members 110 and 130 located on the rearward side relative to the pair of vehicle-body mounting members 60 and 80. This can reduce the occurrence of undesirable deformation and crush of the subframe 1, and can consequently exhibit required collision performance.

In the subframe 1 according to the present embodiment, the opposite end portions of a lower cross member 32 in the width direction extend in the forward-rearward direction respectively along the reinforcement portions 126 and 146 of the lower side members 117 and 137 of the pair of side members 110 and 130, and constitute a pair of bulkhead portions 36 and 38, each of which extends toward the upward side, and the upper end portions of the pair of bulkhead portions 36 and 38 in the upward-downward direction are respectively joined to the upper cross member 150. This configuration can increase the strength and rigidity of the subframe 1 on the rearward side relative to the weakened portions 116 and 136 of the pair of side members 110 and 130, and further ensures that an impact force applied at the time of, typically, front collision of the vehicle can be transmitted to the vehicle body in a distributed manner.

In cross-section taken along the plane parallel to the plane defined by the upward-downward direction and the width direction, the subframe 1 according to the present embodiment has a closed cross-section defined by the upper cross member 150, the lower cross member 32, and the pair of bulkhead portions 36 and 38 in cooperation with each other, a closed cross-section defined by the upper cross member 150, one of the lower side members 117 and 137 of the pair of side members 110 and 130, and one of the pair of bulkhead portions 36 and 38 in cooperation with each other, and a closed cross-section defined by the upper cross member 150, the other one of the lower side members 117 and 137 of the pair of side members 110 and 130, and the other one of the pair of bulkhead portions 36 and 38 in cooperation with each other. This configuration can more significantly increase the strength and rigidity of the subframe 1 on the rearward side relative to the weakened portions 116 and 136 of the pair of side members 110 and 130, and further ensures that an impact force applied at the time of, typically, front collision of the vehicle can be transmitted to the vehicle body in a distributed manner.

In the present invention, the types, shapes, arrangements, numbers, and the like of the constituent members are not limited to those in the above embodiment, and it is needless to mention that the constituent elements can be modified as appropriate without departing from the scope of the invention, such as appropriately replacing these constituent elements with other members having equivalent operational effects.

As described above, in the present invention, it is possible to provide a vehicle subframe that can have an increased strength and rigidity and can exhibit required collision performance, while uniformly applying press-formed products as main constituent members of the subframe. Therefore, because of its general purposes and universal characteristics, applications of the present invention can be expected in a wide range in the field of a subframe of a moving body such as a vehicle.

What is claimed is:

1. A vehicle subframe to be attached to a vehicle body through a pair of front vehicle-body mounting portions provided opposite to each other in a width direction of the vehicle body on a forward side in a forward-rearward direction of the vehicle body, through a pair of rear vehicle-body mounting portions provided opposite to each other in the width direction on a rearward side in the forward-rearward direction, and through a pair of intermediate vehicle-body mounting portions provided opposite to each other in the width direction between the front vehicle-body mounting portions and the rear vehicle-body mounting portions in the forward-rearward direction, the vehicle subframe comprising:

a pair of side members disposed opposite to each other in the width direction while extending in the forward-rearward direction, the pair of side members being provided with the pair of front vehicle-body mounting portions and the pair of rear vehicle-body mounting portions correspondingly, each of the side members being formed from a plate member;

a cross member extending in the width direction while connecting the pair of side members, the cross member being formed from a plate member; and a pair of mounting members disposed opposite to each other in the width direction, each of which extends toward an outer side in the width direction while protruding toward an upward side in an upward-downward direction of the vehicle body, the pair of mounting members being provided with the pair of intermediate vehicle-body mounting portions correspondingly, wherein the pair of side members includes upper side members and lower side members, respectively, the lower side members extending opposed on a downward side in the upward-downward direction to the upper side members while being elongated to the rearward side, and the pair of mounting members is joined respectively to the lower side members of the pair of side members correspondingly, and wherein the cross member includes an upper cross member and a lower cross member disposed on the downward side relative to the upper cross member and joined to the upper cross member, the upper side members of the pair of side members are joined respectively to opposite outer front end portions of the upper cross member in the width direction, and extend from the opposite outer front end portions toward the forward side, and the lower side members of the pair of side members are joined respectively to the upper side members, the upper cross member, and the lower cross member, the upper side members of the pair of side members are provided with the pair of front vehicle-body mounting portions correspondingly, while the lower side members of the pair of side members are provided with the pair of front vehicle-body mounting portions and the pair of rear vehicle-body mounting portions correspondingly, the pair of side members respectively includes weakened portions on the forward side relative to the pair of intermediate vehicle-body mounting portions, the weakened portions being deformable against an impact force applied toward the rearward side, and the lower side members of the pair of side members respectively include reinforcement portions continuously connecting the pair of intermediate vehicle-body mounting portions and the pair of rear vehicle-body mounting portions correspondingly in the forward-rearward direction, the reinforcement portions having a shape protruding in the upward direction or the downward direction in cross-section taken along a plane parallel to a plane defined by the upward-downward direction and the width direction.

2. The vehicle subframe according to claim 1, wherein the pair of mounting members is provided respectively with a part of a pair of arm support portions located opposite to each other in the width direction to support a pair of suspension arms correspondingly.

3. The vehicle subframe according to claim 1, wherein opposite end portions of the lower cross member in the width direction extend in the forward-rearward direction respectively along the reinforcement portions of the lower side members of the pair of side members, and constitute a pair of bulkhead portions, each of which extends toward the upward side, and upper end portions of the pair of bulkhead portions in the upward-downward direction are respectively joined to the upper cross member.

4. The vehicle subframe according to claim 3, wherein in cross-section taken along a plane parallel to a plane defined by the upward-downward direction and the width direction, the vehicle subframe has a closed cross-section defined by the upper cross member, the lower cross member, and the pair of bulkhead portions in cooperation with each other, a closed cross-section defined by the upper cross member, one of the lower side members of the pair of side members, and one of the pair of bulkhead portions in cooperation with each other, and a closed cross-section defined by the upper cross member, the other one of the lower side members of the pair of side members, and the other one of the pair of bulkhead portions in cooperation with each other.

\* \* \* \* \*